US011950542B2

(12) United States Patent
    Griffini

(10) Patent No.: US 11,950,542 B2
(45) Date of Patent: Apr. 9, 2024

(54) TURF CUTTING MACHINE

(71) Applicant: IBEA S.R.L., Vescovato (IT)

(72) Inventor: Alberto Griffini, Tradate (IT)

(73) Assignee: IBEA S.R.L., Vescovato (IT)

( * ) Notice: Subject to any disclaimer, the term of this patent is extended or adjusted under 35 U.S.C. 154(b) by 267 days.

(21) Appl. No.: 17/435,114

(22) PCT Filed: Feb. 27, 2020

(86) PCT No.: PCT/IB2020/051685
    § 371 (c)(1),
    (2) Date: Aug. 31, 2021

(87) PCT Pub. No.: WO2020/178682
    PCT Pub. Date: Sep. 10, 2020

(65) Prior Publication Data
    US 2022/0095554 A1  Mar. 31, 2022

(30) Foreign Application Priority Data
    Mar. 1, 2019  (IT) .................. 102019000003051

(51) Int. Cl.
    *A01G 20/12*  (2018.01)
    *A01B 51/02*  (2006.01)
(52) U.S. Cl.
    CPC ........... *A01G 20/12* (2018.02); *A01B 51/026* (2013.01)
(58) Field of Classification Search
    CPC ........ A01G 20/12; A01G 20/10; A01G 20/15; A01G 20/18; A01G 20/30; A01G 20/35; A01B 51/026; A01B 1/246; A01B 45/00; A01B 45/02; A01B 45/023; A01B 45/026; A01B 51/00; A01B 51/02; A01B 33/028;
    (Continued)

(56) References Cited

U.S. PATENT DOCUMENTS 2,905,253 A * 9/1959 Ditter ..................... A01G 20/12
                                                    172/75
3,201,944 A * 8/1965 Christensen ............ E02F 5/103
                                                    405/184
(Continued)

FOREIGN PATENT DOCUMENTS

BE        1026593 A1 *  3/2020  ............. A01G 20/12
BR      MU8502496 U  *  5/2006
(Continued)

OTHER PUBLICATIONS

International Search Report and Written Opinion of the International Searching Authority issued for International PCT Application No. PCT/IB2020/051685 dated Jun. 15, 2020.

Primary Examiner — Adam J Behrens
Assistant Examiner — Blake E Scoville
(74) Attorney, Agent, or Firm — Howson & Howson LLP

(57) ABSTRACT

A turf cutting machine, more particularly a four-wheel drive turf cutting machine, is provided. The turf cutting machine has a transmission arrangement which includes a transmission belt arranged between a rear axle pulley and a front axle pulley and which further includes a plurality of deflection pulleys which are arranged between the rear axle pulley and the front axle pulley so as to define a path for the transmission belt that extends from a rear axle to a front axle and then back to the rear axle passing over a cutting blade.

9 Claims, 6 Drawing Sheets

(58) Field of Classification Search
CPC ..... A01B 33/08; A01B 33/082; A01B 33/087; A01B 33/103
See application file for complete search history.

(56) References Cited

U.S. PATENT DOCUMENTS

| | | | | |
|---|---|---|---|---|
| 3,519,082 | A * | 7/1970 | Miner | A01G 20/15 172/1 |
| 3,564,823 | A * | 2/1971 | Rhoads | A01D 78/02 56/2 |
| 5,520,253 | A * | 5/1996 | Kesting | A01B 51/02 74/355 |
| 5,690,178 | A * | 11/1997 | Zehrung, Jr. | A01G 20/12 172/19 |
| 6,962,209 | B2 * | 11/2005 | Isaman | A01G 20/12 180/385 |
| 2003/0037934 | A1 | 2/2003 | Isaman et al. | |

FOREIGN PATENT DOCUMENTS

| | | |
|---|---|---|
| CN | 205921929 U | 2/2017 |
| GB | 926993 | 5/1963 |

\* cited by examiner

TURF CUTTING MACHINE

TECHNICAL FIELD OF THE INVENTION

The present invention relates to a turf cutting machine.
More particularly, the present invention relates to a four-wheel drive turf cutting machine.

BACKGROUND ART

Turf cutting machines are known from the art, which machines are used to remove an old layer of turf in order to lay down a new layer of turf, or to cut a layer of turf that has to be transplanted to another place.

Turf cutting machines allow to build and renovate gardens in just a few hours, and also to repair existing turfgrasses, such as for example football fields or tennis courts.

Turf cutting machines can also be used to temporarily remove a strip of turf in order to perform an excavation (for example during a cable and/or pipe laying operation).

In general, a turf cutting machine comprises a frame which is mounted on a pair of front wheels and a pair of rear wheels and carries a motor and a cutting blade. The motor is used both to transmit motion to the wheels and to transmit motion to the cutting blade, which moves with an oscillating alternating motion to dig the ground and cut the turf.

The distance of the cutting blade from the ground must be adjustable to allow selection of the depth at which said blade enters the ground and, consequently, the thickness of the cut turf. Since the rotation center of the cutting blade is fixed relative to the frame, the adjustment of the distance of said cutting blade from the ground is obtained by moving the axle of the front wheels (front axle) and the axle of the rear wheels (rear axle), which axles are movable relative to the frame thanks to the provision of an articulated parallel link hitch. In this way, the front wheels and the rear wheels can move up and down parallel to the rotation center of the cutting blade, which results in the distance of the cutting blade from the ground being varied.

Usually, turf cutting machines have two driving wheels, namely the two rear wheels.

In some cases, said rear drive wheels are replaced by a rear drive roller; however, this solution has the drawback that the rear roller passes over the freshly cut turf, with the risk of damaging it.

In general, the cutting blade is arranged within the wheel track and very often it happens that, due to the resistance encountered by the blade during cutting and to the humidity of the grass, the two driving wheels slip and the machine does not advance.

Consequently, the operator has to place one foot on the frame of the machine and push it to help it move forward. This operation, besides being uncomfortable and tiring, entails risks for the operator, who runs the risk of falling or suffering muscle sprains and/or strains.

In addition, uneven advancing of the turf cutting machine can also adversely affect the quality of the cut turf layer.

The object of the present invention is to overcome the drawbacks of the prior art, by providing a turf cutting machine which has improved traction and adhesion to the ground during operation, so as to avoid slippage on the ground and to guarantee a uniform forward movement of the machine itself.

This and other objects are achieved by means of a turf cutting machine as claimed in the appended claims.

SUMMARY OF THE INVENTION

The invention overcomes the drawbacks of the prior art by providing a four-wheel drive turf cutting machine: four driving wheels allow to transmit a double driving force to the ground, thus facilitating the advancement of the turf cutting machine during operation.

Making a four-wheel drive turf cutting machine is not an obvious solution due to two main reasons mentioned above:
    the front axle and the rear axle must be movable relative to the machine frame for allowing adjustment of the distance of the cutting blade from the ground;
    the cutting blade is arranged, along with its driving system, between the front axle and the rear axle and within the wheel track.

By way of example, a solution envisaging use of transmission shafts between the rear axle and the front axle would be practically impossible to implement due to the above-mentioned reasons.

Even if a transmission belt is used, said transmission belt cannot directly connect two pulleys located on the front axle and, respectively, on the rear axle, since the distance between said axles varies when the distance of the cutting blade from the ground is varied, in particular when the axles are moved relative to the frame by means of the articulated parallel link hitch.

In addition, a transmission belt directly connecting two pulleys located on the front axle and, respectively, on the rear axle would risk to interfere with the cutting blade and its driving system.

According to the invention, the motion is transmitted from the rear axle to the front axle (or vice versa) by means of a transmission arrangement which includes a transmission belt, a pulley mounted on the rear axle, a pulley mounted on the front axle, and a plurality of deflection pulleys which are arranged so as to define a path for the transmission belt that goes from the rear axle to the front axle and then back to the rear axle passing over the cutting blade and its driving system.

Preferably said deflection pulleys are idler pulleys.

In a preferred embodiment of the invention, said deflection pulleys, together with the pulleys mounted on the rear and front axles, define a path for the transmission belt which schematically has the shape of an inverted "U", with a horizontal section arranged above the cutting blade and vertical sections joining respective ends of said horizontal section to respective axles.

More precisely, taking into account the fact that the path of the transmission belt forms a closed loop, it defines a double inverted "U", a first inverted "U" going from the rear axle to the front axle, and a second inverted "U" going from the front axle back to the rear axle. In a particularly preferred embodiment of the invention, the arrangement of the deflection pulleys takes into account the variation of the axle spacing when the distance of the cutting blade from the ground is varied.

In other words, the arrangement of the deflection pulleys is such that the length or perimeter of the path of the transmission belt defined by said deflection pulleys, together with the pulleys mounted on the rear and front axles, does not vary when the distance of the cutting blade from the ground is varied.

For this purpose, said deflection pulleys are mounted on the same support of the pulley of the rear axle or on the same support of the pulley of the front axle, so that the pulleys move together when the axles are moved to vary the distance of the cutting blade from the ground. This arrangement allows to obtain undeniable advantages.

Firstly, it allows to keep the tension of the transmission belt constant.

Secondly, it avoids any slipping of the front wheels on the ground when the lever for adjusting the distance of the cutting blade from the ground is actuated; such a slip would represent an important drawback as the actuation of the lever would become extremely tiring, since the driving torque would be generated on one axle only.

BRIEF DESCRIPTION OF DRAWINGS

Further advantages and features of the invention will become more evident from the following detailed description of a preferred embodiment, given by way of non-limiting example, with reference to the attached drawings, in which.

DESCRIPTION OF EMBODIMENTS

Figure 1:
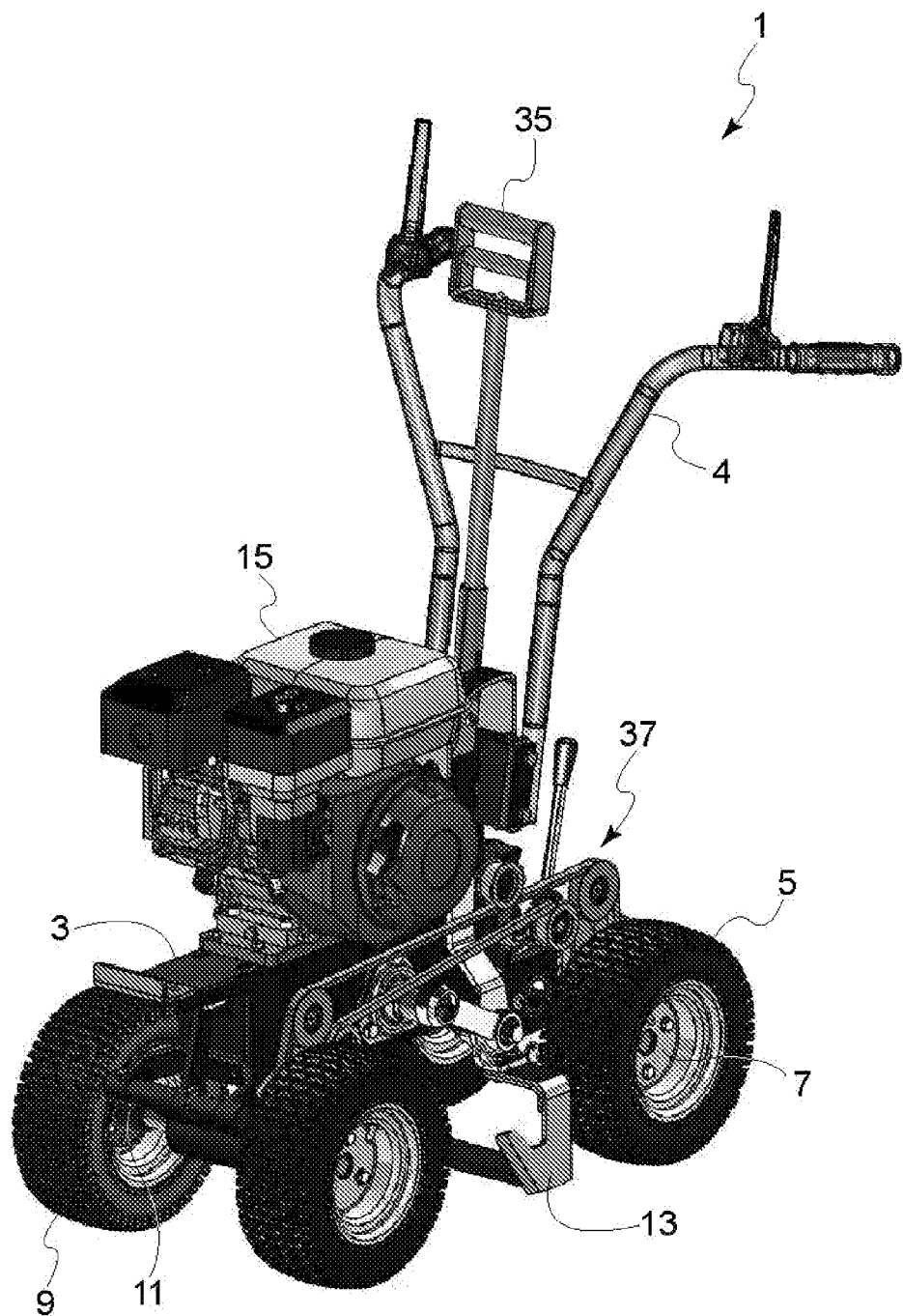
FIG. 1 is a perspective view of a turf cutting machine according to the invention.

With reference to FIGS. 1-4, a turf cutting machine 1 according to a preferred embodiment of the invention is schematically shown.

In a per se known manner, the turf cutting machine 1 comprises a frame 3 mounted on wheels, namely on a pair of rear wheels 5 mounted on a rear axle 7 and a pair of front wheels 9 mounted on a front axle 11.

The rear axle 7 and the front axle 11 are rigidly connected to the respective wheels.

The turf cutting machine 1 is equipped with a handlebar 4, integral with the frame 3, which allows the user to drive the machine.

The turf cutting machine 1 is also equipped with a cutting blade 13 mounted on the frame 1 between the rear axle 7 and the front axle 11 and within the track of the rear and front wheels 5, 9.

The frame 3 carries a motor 15, which drives both the rear and front wheels 5, 9 for advancing the machine 1, and the cutting blade 13.

Figure 3:
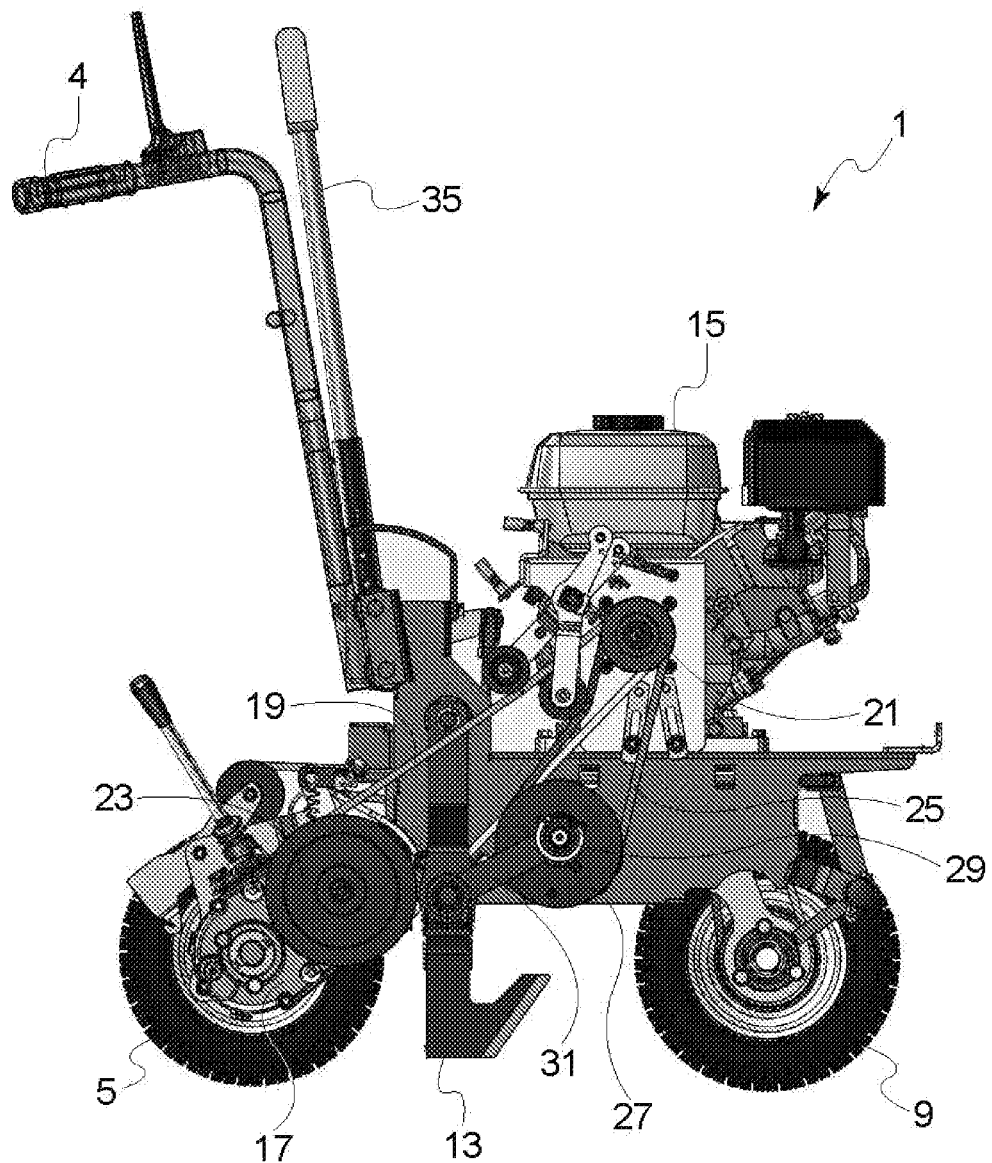
FIG. 3 is a side view from the right of the turf cutting machine of FIG. 2.

For this purpose, the motor 15 is connected to a gearbox 17 by means of a first belt 19 which is mounted between a motor pulley 21 and a gearbox pulley 23, and it is further connected by means of a second belt 25 which is mounted between the motor pulley 21 and a blade pulley 27 (see in particular FIG. 3).

The motion is transmitted from the motor 15 to the rear wheels 5 through the gearbox 17.

The motion is also transmitted from the motor 15 to the cutting blade 13 through an eccentric 29 which is integral with the blade pulley 27 and which, through two connecting rods 31, moves the cutting blade 13 horizontally with a reciprocating oscillating motion, which cutting blade is hinged at a rotation center above the connecting rods 31.

Figure 4:
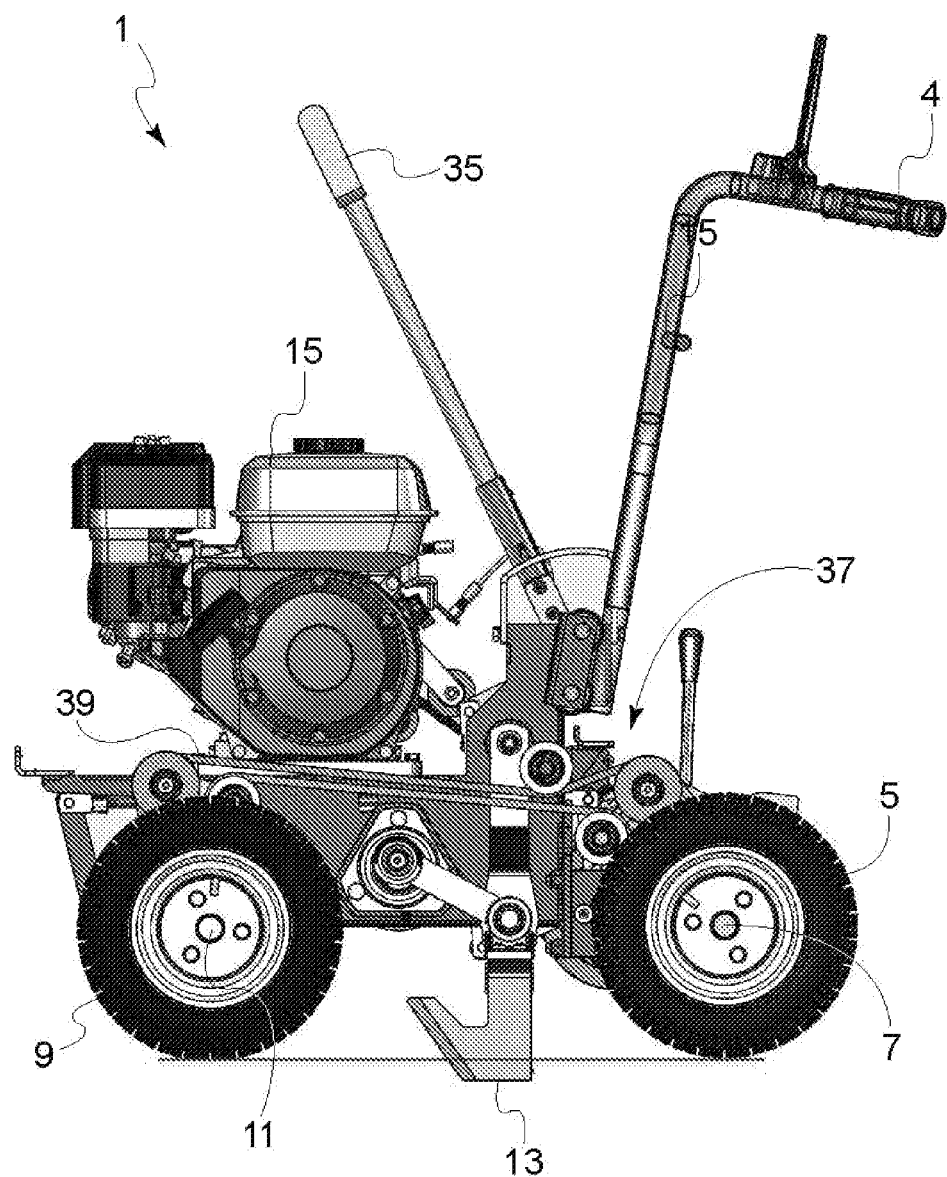
FIG. 4 is a side view from the left of the turf cutting machine of FIG. 1, shown in a second operating configuration.

In order to adjust the distance of the cutting blade 13 from the ground and, therefore, the depth at which said cutting blade enters the ground and the thickness of the cut turf, the rear axle 7 and the front axle 11 are mounted on the frame 3 with the interposition of an articulated parallel link hitch 33, which allows the axles 7, 11 to be moved between a first position, in which they are at the maximum distance from the frame and, consequently, the cutting blade 13 is at the maximum distance from the ground (FIGS. 2, 3), and a position in which they are at the minimum distance from the frame and, consequently, the cutting blade 13 is at the minimum distance from the ground (FIG. 4).

The articulated parallel link hitch 33 is controlled by an actuating lever 35.

According to the invention, the turf cutting machine 1 is a four-wheel drive machine and, for this purpose, it includes a transmission arrangement 37 for transmitting motion from the rear axle 7 to the front axle 11.

Figure 5:
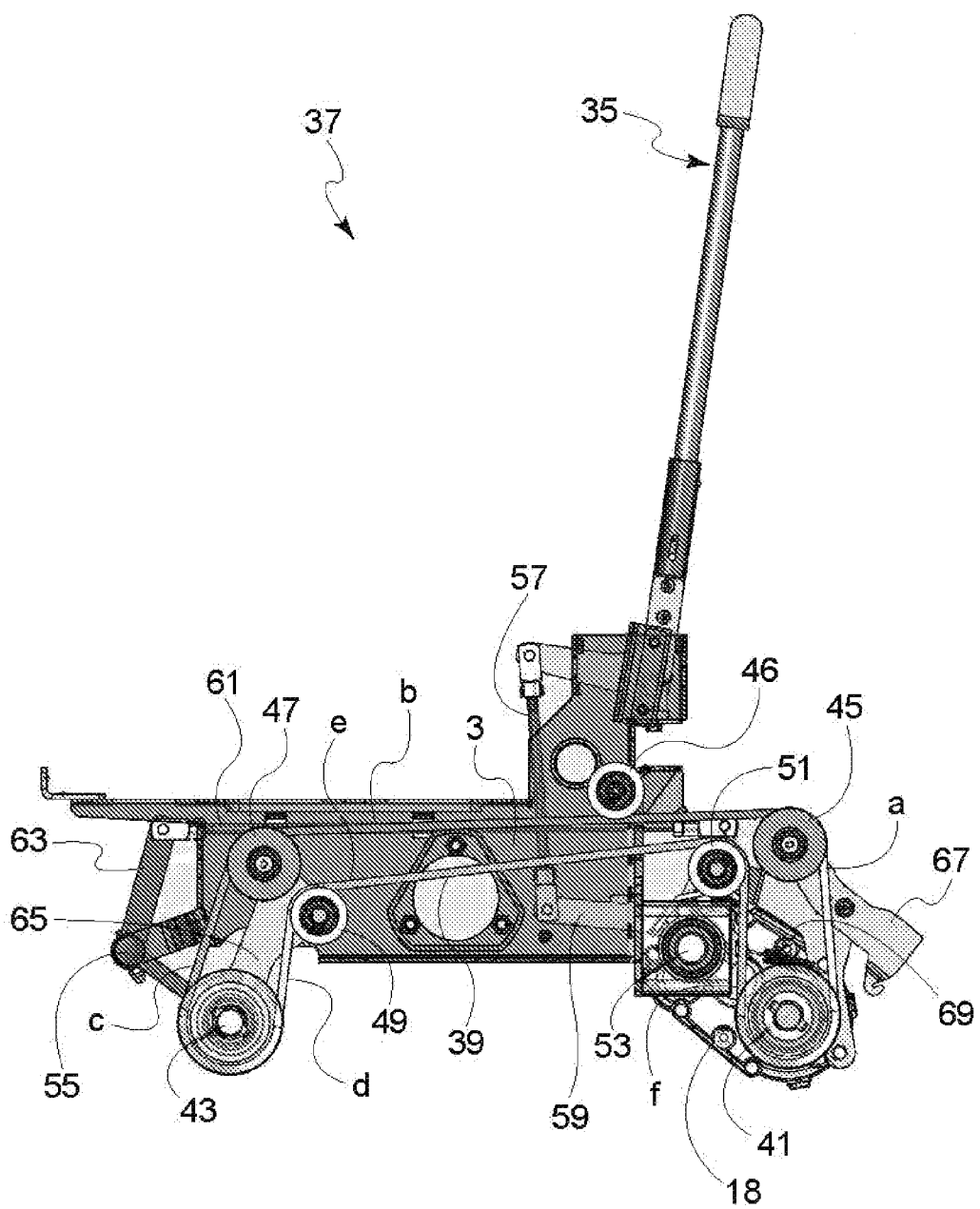
FIG. 5 schematically shows the motion transmission arrangement of the turf cutting machine of FIG. 1, shown in said first operating configuration.
Figure 6:
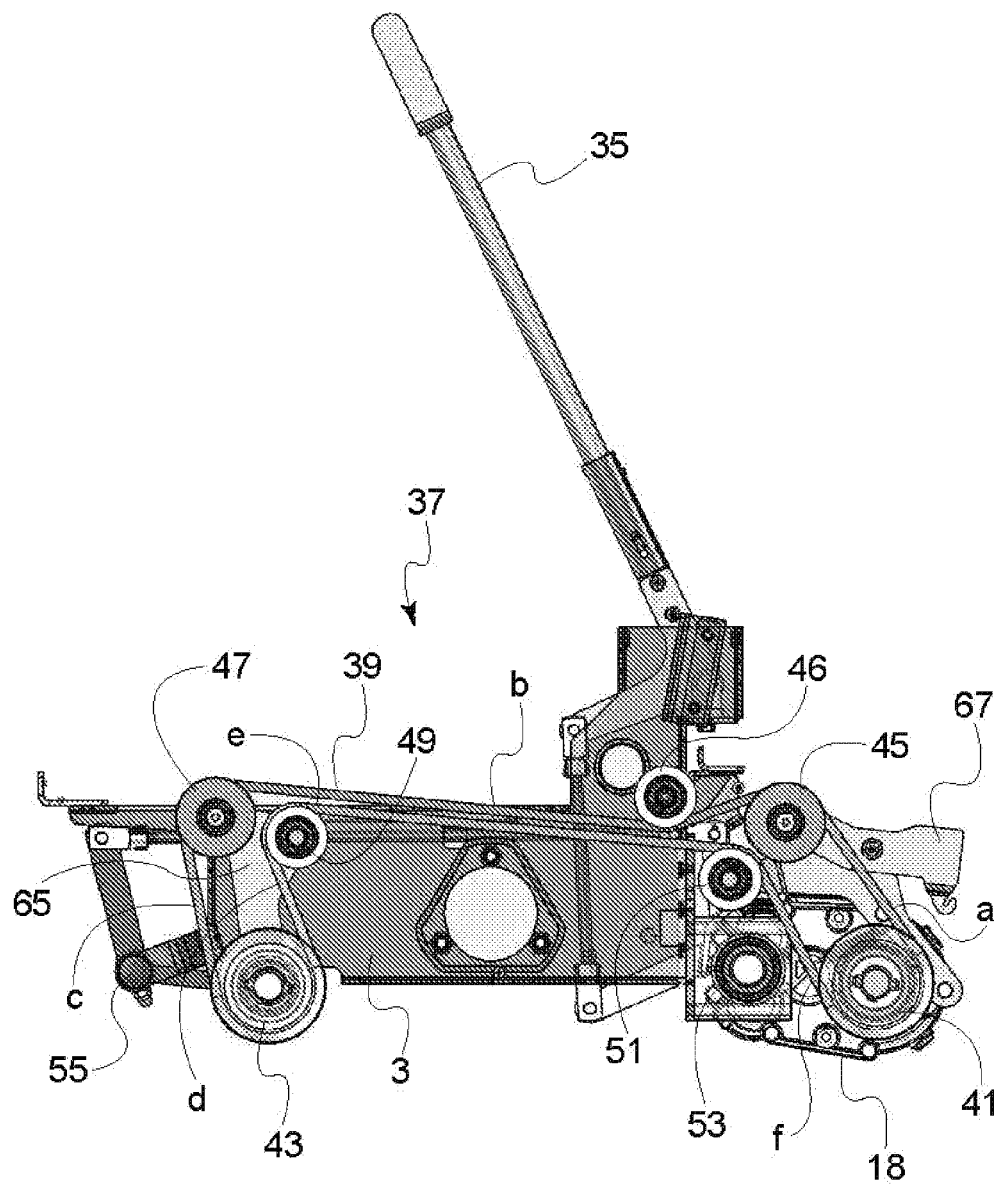
FIG. 6 schematically shows the motion transmission arrangement of the turf cutting machine of FIG. 1, shown in said second operating configuration.

The transmission arrangement 37 is also shown in greater detail in FIGS. 5 and 6.

For the above purpose, the transmission arrangement 37 comprises a transmission belt 39 which is mounted between a rear axle pulley 41 (driving pulley), integral with the rear axle, and a front axle pulley 43 (driven pulley), integral with the front axle.

In order to prevent the transmission belt 39 from interfering with the cutting blade 13 and its driving system, the transmission arrangement 37 comprises a plurality of deflection pulleys 45, 47, 49, 51 which are arranged in such a way that the path of the transmission belt 39 from the rear axle 7 to the front axle 11, and then back again to the rear axle 7, passes over the cutting blade 13.

In the shown embodiment, the path of the transmission belt substantially has the shape of an inverted "U", or, more precisely, taking into account that the path of the transmission belt 39 forms a closed loop, of a double inverted "U", with the horizontal section arranged above the cutting blade and vertical sections joining respective ends of said horizontal section to respective axles.

In detail, the path of the transmission belt includes a portion going from the rear axle 7 to the front axle 11 which comprises a first substantially vertical section a, going from the rear axle pulley 41 to a first deflection pulley 45, a substantially horizontal section b, arranged above the cutting blade 13 and going from the first deflection pulley 45 to a second deflection pulley 47, and a second substantially vertical section c, going from the second deflection pulley 47 to the front axle pulley 43. The path of the transmission belt further includes a "return" portion from the front axle 11 to the rear axle 7 which comprises a first substantially vertical section d, going from the front axle pulley 43 to a third deflection pulley 49, a substantially horizontal section e, arranged above the cutting blade 13 and going from the third deflection pulley 49 to a fourth deflection pulley 51, and a second substantially vertical section f, going from the fourth deflection pulley 51 to the rear axle pulley 41.

Figure 2:
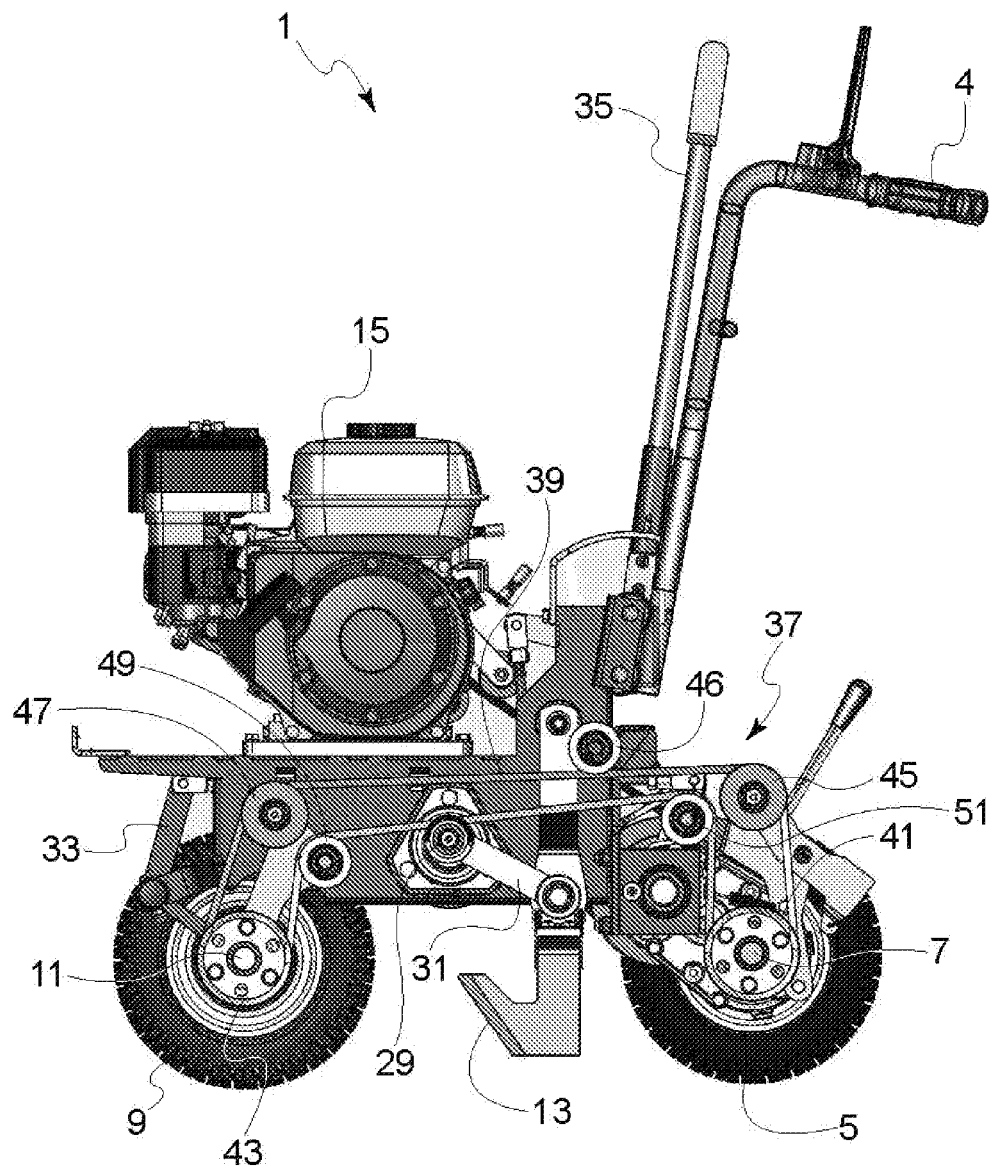
FIG. 2 is a side view from the left of the turf cutting machine of FIG. 1, shown in a first operating configuration.

As can be seen in FIGS. 2 and 4, the sections a, b, c of the path of the transmission belt form a first inverted "U" and the sections d, e, f of the path of the transmission belt form a second inverted "U".

The deflection pulleys 45, 47, 49, 51 are preferably idler pulleys.

A further fixed pulley 46, fixedly mounted on the frame 3, is provided along the horizontal section b of the path of the transmission belt 39 between the first and the second deflection pulleys 45, 47.

The fixed pulley 46 is also preferably an idler pulley.

In order to guarantee that the transmission belt 39 remains correctly stretched and the motion is correctly transmitted to both axles 7, 11 in any operating configuration of the machine 1, the deflection pulleys 45, 47, 49, 51 are arranged in such a way that the length (perimeter) of the path of the transmission belt 39 (a+b+c+d+e+f) is constant and remains constant when the articulated parallel link hitch is actuated for bringing the axles 7, 11 from the first operating configuration to the second operating configuration, and vice versa.

For this purpose, as will be illustrated in detail below, the first and fourth deflection pulleys 45, 51 are mounted on the same support as the rear axle pulley 41 and the second and third deflection pulleys 47, 49 are mounted on the same support as the front axle pulley 43 so that these pulleys move together when the axles 7, 11 move from the first operating configuration to the second operating configuration, and vice versa.

As better visible in FIGS. 5 and 6, the articulated parallel link hitch 33 comprises a rear rotation center 53 and a front rotation center 55 which are connected to the actuating lever 35 by means of return elements 57, 59 and, respectively, 61, 63.

In detail, the actuating lever 35 is connected to the rear rotation center 53 by means of a first return connecting rod 57 and a first return arm 59, which is integral with the gearbox plate 18 of the gearbox 17, said rear rotation center 53 being also integral with the gearbox plate 18 of the gearbox 17.

Furthermore, the actuating lever 35 is connected to the front rotation center 55 by means of a second return connecting rod 61 and a second return arm 59.

In this way, by acting on the actuating lever 35, the user can move the axles 7, 11 from the first operating configuration (FIG. 5) to the second operating configuration (FIG. 6), and vice versa.

By providing the first deflection pulley 45 and the fourth deflection pulley 51 mounted on the gearbox plate 18, on which the rear axle pulley 41 is also mounted, and by providing the second deflection pulley 47 and the third deflection pulley 49 mounted on a plate 65, on which the front axle pulley 43 is also mounted, when the axles 7, 11 pass from the first operating configuration to the second operating configuration, and vice versa, the first deflection pulley 45 and the fourth deflection pulley 51 move together with the rear axle pulley 41, and the second deflection pulley 47 and the third deflection pulley 49 move together with the front axle pulley 43, so that the length of the path of the transmission belt 39 (a+b+c+d+e+f) remains constant when the axles move.

This arrangement ensures that the transmission belt is constantly stretched and steady and that the motion is always correctly transmitted to both axles.

Advantageously, in the shown embodiment, the first deflection pulley 45 is not fixedly mounted on the gearbox plate 18, but, on the contrary, it is mounted on the gearbox plate 18 with the interposition of an oscillating arm 67.

Advantageously, the kinematic mechanism formed by the oscillating arm 67 and the first deflection pulley 45, loaded by a spring 69, serves to keep the transmission belt 39 stretched, thus compensating for wear and/or dimensional variations over time.

From the foregoing, it is clear that the invention satisfactorily achieves the object set forth above, allowing to achieve a four-wheel drive turf cutting machine.

It is also evident that the embodiment described above has been given by way of non-limiting example, and several modifications and variations are possible without departing from the scope of protection as defined by the appended claims.

The invention claimed is:

1. A turf cutting machine, comprising a frame, the frame being mounted on a rear axle that carries a pair of rear wheels and on a front axle that carries a pair of front wheels, wherein the frame carries a rigid cutting blade that extends horizontally beneath the frame, that is configured to cut below a turf at a selectable depth, and that is arranged between the rear axle and the front axle, and a motor that drives both the front wheels and the rear wheels and the cutting blade, wherein the rear axle and the front axle are connected to the frame in such a way that they are movable from a first position, in which they are at a maximum distance from the frame, to a second position, in which they are at a minimum distance from the frame, and vice versa, wherein the turf cutting machine comprises a transmission arrangement for transmitting motion from the rear axle to the front axle, or vice versa, the transmission arrangement comprising a transmission belt mounted between a rear axle pulley integral with the rear axle, and a front axle pulley integral with the front axle, and wherein the transmission belt runs on a plurality of deflection pulleys, which are arranged in such a way that a path of the transmission belt passes above the cutting blade, wherein the path of the transmission belt includes a first portion, going from the rear axle to the front axle and comprising a first substantially vertical section, extending from the rear axle pulley to a first deflection pulley, a substantially horizontal section, arranged above the cutting blade and extending from the first deflection pulley to a second deflection pulley, and a second substantially vertical section extending from the second deflection pulley to the front axle pulley, and wherein the path of the transmission belt further includes a second portion, going from the front axle to the rear axle and comprising a first substantially vertical section, extending from the front axle pulley to a third deflection pulley, a substantially horizontal section, arranged above the cutting blade and extending from the third deflection pulley to a fourth deflection pulley, and a second substantially vertical section extending from the fourth deflection pulley to the rear axle pulley.

2. The turf cutting machine according to claim 1, wherein the deflection pulleys are idler pulleys.

3. The turf cutting machine according to claim 1, wherein the deflection pulleys are arranged in such a way that a length of the path of the transmission belt does not change when the rear and front axles move from the first position to the second position, and vice versa.

4. The turf cutting machine according to claim 3, wherein the deflection pulleys are mounted on a same support carrying the rear axle pulley or on a same support carrying the front axle pulley.

5. The turf cutting machine according to claim 1, wherein the first and fourth deflection pulleys are mounted on a same support carrying the rear axle pulley, and wherein the second and third deflection pulleys are mounted on a same support carrying the front axle pulley.

6. The turf cutting machine according to claim 5, wherein one of the deflection pulleys is mounted on a respective support with interposition of an oscillating arm loaded by a spring.

7. The turf cutting machine according to claim 1, wherein the rear axle and the front axle are connected to the frame with interposition of an articulated parallel link hitch, allowing to move the axles from the first position to the second position, and vice versa.

8. The turf cutting machine according to claim 4, wherein one of the deflection pulleys is mounted on a respective support with interposition of an oscillating arm loaded by a spring.

9. The turf cutting machine according to claim 3, wherein the deflection pulleys are idler pulleys.

* * * * *